(12) United States Patent
Chae

(10) Patent No.: US 11,927,828 B2
(45) Date of Patent: Mar. 12, 2024

(54) OPTICAL IMAGING SYSTEM INCLUDING SEVEN LENSES OF +---+-+OR +--++-+REFRACTIVE POWERS

(71) Applicant: Samsung Electro-Mechanics Co., Ltd., Suwon-si (KR)

(72) Inventor: Kyu Min Chae, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 0 days.

(21) Appl. No.: 17/585,995

(22) Filed: Jan. 27, 2022

(65) Prior Publication Data
US 2022/0146788 A1    May 12, 2022

Related U.S. Application Data

(63) Continuation of application No. 16/365,934, filed on Mar. 27, 2019, now Pat. No. 11,269,160.

(30) Foreign Application Priority Data

Jul. 12, 2018 (KR) ........................ 10-2018-0081061

(51) Int. Cl.
G02B 13/00    (2006.01)
G02B 9/64    (2006.01)

(52) U.S. Cl.
CPC ........... *G02B 9/64* (2013.01); *G02B 13/0045* (2013.01)

(58) Field of Classification Search
CPC .............................. G02B 9/64; G02B 13/0045
See application file for complete search history.

(56) References Cited

U.S. PATENT DOCUMENTS

| 2009/0052055 A1 | 2/2009 | Lin |
| 2012/0162787 A1 | 6/2012 | Adachi et al. |
| 2013/0050846 A1* | 2/2013 | Huang ............... G02B 1/041 359/713 |
| 2013/0242175 A1 | 9/2013 | Kuzuhara et al. |
| 2015/0205070 A1 | 7/2015 | Lee |

(Continued)

FOREIGN PATENT DOCUMENTS

| CN | 104793316 A | 7/2015 |
| CN | 206348500 U | 7/2017 |

(Continued)

OTHER PUBLICATIONS

Chinese Office Action dated Mar. 3, 2021, in counterpart Chinese Patent Application No. 201910427883.7 (15 pages in English, 12 pages in Mandarin).

Chinese Office Action dated Jan. 6, 2022, in counterpart Chinese Patent Application No. 201910427883.7 (5 pages in English, 6 pages in Mandarin).

(Continued)

*Primary Examiner* — Wen Huang
(74) *Attorney, Agent, or Firm* — NSIP Law

(57) ABSTRACT

An optical imaging system includes a first lens, a second lens, a third lens, a fourth lens, a fifth lens having a convex image-side surface, a sixth lens, and a seventh lens disposed in order from an object side, and a distance from the image-side surface of the fifth lens to an object-side surface of the sixth lens is shorter than a distance from an image-side surface of the sixth lens to an object-side surface of the seventh lens.

7 Claims, 12 Drawing Sheets

(56) References Cited

U.S. PATENT DOCUMENTS

| | | | |
|---|---|---|---|
| 2015/0277083 A1* | 10/2015 | Chae | G02B 9/64 359/708 |
| 2016/0085054 A1 | 3/2016 | Asami | |
| 2017/0090158 A1 | 3/2017 | Tang et al. | |
| 2017/0219820 A1 | 8/2017 | Kobayashi et al. | |
| 2018/0031807 A1 | 2/2018 | Chen et al. | |
| 2018/0074298 A1 | 3/2018 | Jung et al. | |
| 2019/0154974 A1* | 5/2019 | Chen | G02B 27/0037 |
| 2019/0196151 A1 | 6/2019 | Chen et al. | |
| 2019/0227279 A1* | 7/2019 | Yang | G02B 13/0045 |
| 2019/0339488 A1 | 11/2019 | Komiyama et al. | |
| 2019/0353874 A1* | 11/2019 | Yeh | G02B 13/0045 |
| 2020/0142158 A1 | 5/2020 | Yao et al. | |
| 2020/0257085 A1 | 8/2020 | Yang et al. | |
| 2020/0301106 A1 | 9/2020 | Jung et al. | |
| 2021/0072507 A1 | 3/2021 | Huang | |

FOREIGN PATENT DOCUMENTS

| | | |
|---|---|---|
| CN | 107167899 A | 9/2017 |
| CN | 107817576 A | 3/2018 |
| EP | 1 956 405 A1 | 8/2008 |
| JP | 2017-134235 A | 8/2017 |
| KR | 10-2010-0114167 A | 10/2010 |
| KR | 10-1302271 B1 | 9/2013 |
| KR | 10-2017-0045864 A | 4/2017 |

OTHER PUBLICATIONS

U.S. Appl. No. 16/365,934, filed Mar. 27, 2019, Kyu Min Chae.
Korean Office Action dated Jan. 8, 2024, in counterpart Korean Patent Application No. 10-2018-0081061 (6 pages in English, 5 pages in Korean).

* cited by examiner

OPTICAL IMAGING SYSTEM INCLUDING SEVEN LENSES OF +---+-+OR +--++-+REFRACTIVE POWERS

CROSS-REFERENCE TO RELATED APPLICATIONS

This application is a continuation of application Ser. No. 16/365,934 filed on Mar. 27, 2019, now U.S. patent Ser. No. 11,269,160 issued on Mar. 8, 2022, and claims the benefit under 35 USC 119(a) of Korean Patent Application No. 10-2018-0081061 filed on Jul. 12, 2018, in the Korean Intellectual Property Office, the entire disclosures of which are incorporated herein by reference for all purposes.

BACKGROUND

1. Field

The following description relates to an optical imaging system capable of implementing constant optical performance irrespective of changes in ambient temperature.

2. Description of Background

Generally, surveillance cameras provided in vehicles have been used to image only shapes of surrounding objects, and it has not been necessary to design surveillance cameras to provide high resolution images. However, as a self-driving function has recently been provided in vehicles, there has been demand for an optical system appropriate for a camera which can image objects at a long distance or can provide clearer images of objects at short distance.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an optical imaging system includes a first lens, a second lens, a third lens, a fourth lens, a fifth lens having positive refractive power, a sixth lens, and a seventh lens disposed in order from an object side. At least one of the lenses includes one or more aspherical surfaces, and a distance from an object-side surface of the first lens and to an imaging plane is 20 mm or greater.

The first lens may have positive refractive power.
The third lens may have negative refractive power.
The sixth lens may have negative refractive power.
The third lens may include a concave image-side surface.
The fourth lens may include a concave object-side surface.
The fifth lens may include a convex image-side surface.
The sixth lens may include a concave object-side surface.
The sixth lens may include a concave image-side surface.
The seventh lens may include a convex image-side surface.

In another general aspect, an optical imaging system includes a first lens, a second lens, a third lens, a fourth lens, a fifth lens having a convex image-side surface, a sixth lens, and a seventh lens disposed in order from an object side. A distance from the image-side surface of the fifth lens to an object-side surface of the sixth lens is shorter than a distance from an image-side surface of the sixth lens to an object-side surface of the seventh lens.

A distance from an object-side surface of the first lens to an imaging plane may be 20 mm or greater.

Three or more of the lenses may have refractive indexes of 1.7 or greater.

One surface of a lens, among the lenses, disposed most adjacent to the object side or most adjacent to an imaging plane may be aspherical, and one surface of a lens, among the lenses, adjacent to a stop may be aspherical.

The third lens, the fourth lens, and the fifth lens may each have a refractive index of 1.7 or greater.

The first lens may have positive refractive power.

An Abbe number of the third lens may be within a range of 20 to 45.

A sum of an Abbe number of the third lens and an Abbe number of the second lens may be within a range of 60 to 100.

The optical imaging system may have an F No. of 1.45 or less.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
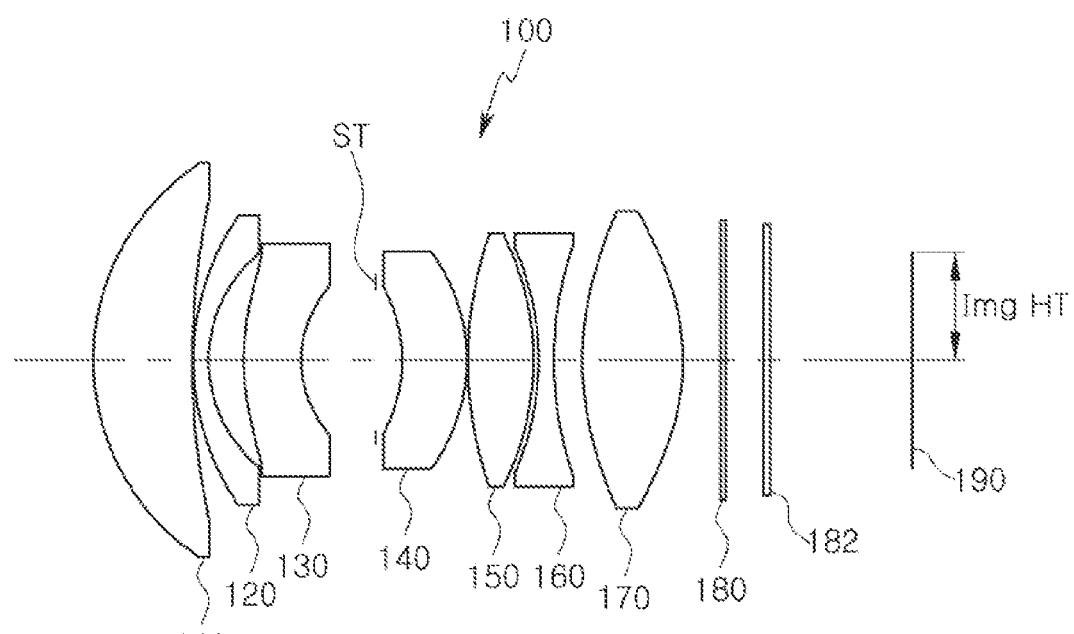
FIG. 1 is a diagram illustrating a first example of an optical imaging system.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Herein, it is noted that use of the term "may" with respect to an example or embodiment, e.g., as to what an example or embodiment may include or implement, means that at least one example or embodiment exists in which such a feature is included or implemented while all examples and embodiments are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

Hereinafter, examples will be described with reference to the attached drawings.

In the examples, an entirety of a radius of curvature, a thickness, and a focal length of a lens are indicated in millimeters (mm). Further, a thickness of a lens, and a gap between lenses are distances measured based on an optical axis of the lens.

In a description of a form of a lens, a surface of a lens being convex indicates that an optical axis region of a corresponding surface is convex, while a surface of a lens being concave indicates that an optical axis region of a corresponding surface is concave. Therefore, in a configuration in which a surface of a lens is described as being convex, an edge region of the lens may be concave. In a similar manner, in a configuration in which a surface of a lens is described as being concave, an edge region of the lens may be convex.

In the examples, an optical imaging system may include a plurality of lenses. For example, the optical imaging system may include seven lenses. In the descriptions below, the lenses of the optical imaging system will be described.

The first lens may have refractive power. For example, the first lens may have positive refractive power.

The first lens may have a convex surface. For example, the first lens may have a convex object-side surface.

The first lens may include a spherical surface. For example, both surfaces of the first lens may be spherical. The first lens may be made of a material having high light transmissivity and excellent workability. For example, the first lens may be made of a glass material. However, a material of the first lens is not limited to a glass material.

The first lens may have a certain refractive index. For example, a refractive index of the first lens may be 1.7 or higher. The first lens may have an Abbe number smaller than an Abbe number of the second lens. For example, an Abbe number of the first lens may be less than 55.

The second lens may have refractive power. For example, the second lens may have negative refractive power.

The second lens may have a convex surface. For example, the second lens may have a convex object-side surface.

The second lens may include a spherical surface. For example, both surfaces of the second lens may be spherical. The second lens may be made of a material having a constant refractive index irrespective of temperature change. For example, the second lens may be made of a glass material.

The second lens may have a certain refractive index. For example, a refractive index of the second lens may be less than 1.60. The second lens may have a certain Abbe number. For example, an Abbe number of the second lens may be within a range of 20 to 75.

The third lens may have refractive power. For example, the third lens may have negative refractive power.

The third lens may have a convex surface. For example, the third lens may have a convex object-side surface.

The third lens may include an aspherical surface. For example, at least one of the object-side surface and the image-side surface of the third lens may be aspherical. The third lens may be made of a material having high light transmissivity and excellent workability. For example, the third lens may be made of a glass material. However, a material of the third lens is not limited to a glass material.

The third lens may have a certain refractive index. For example, a refractive index of the third lens may be 1.80 or greater. The third lens may have a certain Abbe number. For example, an Abbe number of the third lens may be within a range of 20 to 45. As another example, an Abbe number of the third lens may be within a range in which a sum of an Abbe number of the third lens and an Abbe number of the second lens is within a range of 60 to 100.

The fourth lens may have refractive power. For example, the fourth lens may have positive refractive power or negative refractive power.

The fourth lens may have a concave surface. For example, the fourth lens may have a concave object-side surface.

The fourth lens may include a spherical surface. For example, both surfaces of the fourth lens may be spherical. The fourth lens may be made of a material having high light transmissivity and excellent workability. For example, the fourth lens may be made of a glass material. However, a material of the first lens is not limited to a glass material.

The fourth lens may have a certain refractive index. For example, a refractive index of the fourth lens may be 1.70 or higher. The fourth lens may have an Abbe number higher than an Abbe number of the third lens. For example, an Abbe number of the fourth lens may be 40 or higher.

The fifth lens may have refractive power. For example, the fifth lens may have positive refractive power.

The fifth lens may have a convex surface. For example, at least one of the object-side surface and the image-side surface of the fifth lens may be convex.

The fifth lens may include a spherical surface. For example, both surfaces of the fifth lens may be spherical. The fifth lens may be made of a material having high light transmissivity and excellent workability. For example, the fifth lens may be made of a glass material. However, a material of the first lens is not limited to a glass material.

The fifth lens may have a certain refractive index. For example, a refractive index of the fifth lens may be 1.7 or higher. The fifth lens may have an Abbe number lower than an Abbe number of the fourth lens. For example, an Abbe number of the fifth lens may be lower than 60.

The sixth lens may have refractive power. For example, the sixth lens may have negative refractive power.

The sixth lens may have a concave surface. For example, at least one of the object-side surface and the image-side surface of the sixth lens may be concave.

The sixth lens may include a spherical surface. For example, both surfaces of the sixth lens may be spherical. The sixth lens may be made of a material having a constant refractive index irrespective of temperature change. For example, the sixth lens may be made of a glass material.

The sixth lens may have a certain refractive index. For example, a refractive index of the sixth lens may be 1.70 or higher. The sixth lens may have an Abbe number lower than Abbe numbers of adjacent lenses (which are the fifth lens and the seventh lens). For example, an Abbe number of the sixth lens may be less than 30.

The seventh lens may have refractive power. For example, the seventh lens may have positive refractive power.

The seventh lens may have a convex surface. For example, at least one of the object-side surface and the image-side surface of the seventh lens may be convex.

The seventh lens may include an aspherical surface. For example, both surfaces of the seventh lens may be aspherical. The seventh lens may be made of a material having a constant refractive index irrespective of temperature change. For example, the seventh lens may be made of a glass material.

The seventh lens may have a certain refractive index. For example, a refractive index of the seventh lens may be 1.7 or less. The seventh lens may have an Abbe number higher than an Abbe number of the sixth lens. For example, an Abbe number of the seventh lens may be 50 or higher.

Three or more of the first to seventh lenses may have refractive indexes of 1.7 or higher. For example, the third to fifth lenses may have refractive indexes of 1.7 or higher.

The optical imaging system may include one or more aspherical lenses. For example, two or more of the first to seventh lenses may include aspherical surfaces. For example, a lens disposed most adjacent to an object side or an imaging plane, and a lens adjacent to a stop may include aspherical surfaces. The optical imaging system satisfying the conditions above may be desirable to implement a high resolution and to improve aberration. The aspherical surface may be represented by Equation 1 below.

$$Z = \frac{cr^2}{1+\sqrt{1-(1+k)c^2r^2}} + Ar^4 + Br^6 + Cr^8 + Dr^{10} + Er^{12} + Fr^{14} + Gr^{16} + Hr^{18} \qquad (1)$$

In Equation 1 above, "c" is an inverse of a radius of a curvature of a respective lens, "K" is a conic constant, "r" is a distance from a certain point on an aspherical surface of the lens to an optical axis, "A" to "H" are aspheric constants, "Z" (or SAG) is a height from a certain point on an aspherical surface of the lens to an apex of the aspherical surface in an optical axis direction.

The optical imaging system may include an image sensor. The image sensor may be configured to implement a high level of resolution. A surface of the image sensor may form an imaging plane on which a subject is imaged.

The optical imaging system may include a stop. The stop may be disposed between lenses. For example, the stop may be disposed between the third lens and the fourth lens. The stop may adjust the amount of light incident to an image sensor. Lenses adjacent to the stop in the optical imaging system may be configured to have relatively small radiuses of curvature. For example, an image-side surface of the third lens may have a radius of curvature smaller than a radius of curvature of an object-side surface of the third lens, and an object-side surface of the fourth lens may have a radius of curvature smaller than a radius of curvature of an image-side surface of the fourth lens.

The stop may be configured to divide refractive power of the optical imaging system in half. For example, overall refractive power of lenses disposed in a front portion (an object side) of the stop may be negative, and overall refractive power of lenses disposed in a rear portion (an image side) of the stop may be positive. The arrangement of the lenses may be desirable to reduce an overall length of the optical imaging system while widening a field of view of the optical imaging system.

The optical imaging system may include a plurality of filters. The filters may be disposed between the seventh lens and the image sensor and may remove elements which may degrade resolution. For example, the filters may block light with infrared wavelengths. The filters may have certain refractive indices. For example, the refractive indexes of the filters may be 1.50 or higher. The filters may have certain Abbe numbers. For example, Abbe numbers of the filters may be 60 or higher.

The optical imaging system may be configured to significantly reduce changes in focal length caused by temperature. For example, three or more lenses in the optical imaging system may be made of a glass material. The optical imaging system may include an element which may improve mass production. For example, a distance between the sixth lens and the seventh lens may be configured to be greater than a distance between the fifth lens and the sixth lens.

The optical imaging system may have a constant resolution in relatively high temperature or in relatively low temperature. Thus, the optical imaging system may provide clear images even when the optical imaging system is installed in a place easily exposed to an external environment such as front and rear bumpers of vehicles.

In the description below, an optical imaging system will be described in accordance with examples.

An example of an optical imaging system will be described with reference to FIG. 1.

The optical imaging system 100 may include a plurality of lenses having refractive power. For example, the optical imaging system 100 may include a first lens 110, a second lens 120, a third lens 130, a fourth lens 140, a fifth lens 150, a sixth lens 160, and a seventh lens 170.

The first lens 110 may have positive refractive power, and may have a convex object-side surface and a concave image-side surface. The second lens 120 may have negative refractive power, and may have a convex object-side surface and a concave image-side surface. The third lens 130 may have negative refractive power, and may have a convex object-side surface and a concave image-side surface. The fourth lens 140 may have negative refractive power, and may have a concave object-side surface and a convex image-side surface. The fifth lens 150 may have positive refractive power, and may have a convex object-side surface and a convex image-side surface. The sixth lens 160 may have negative refractive power, and may have a concave object-side surface and a concave image-side surface. The seventh lens 170 may have positive refractive power, and may have a convex object-side surface and a convex image-side surface.

The optical imaging system 100 may include a plurality of aspherical lenses. In the optical imaging system 100, both surfaces of the third lens 130 and both surfaces of the seventh lens 170 may be aspherical. The optical imaging system 100 may include a lens made of a glass material to exhibit constant optical performance even when temperature changes due to external conditions.

The optical imaging system 100 may include a stop ST. The stop ST may be disposed between the third lens 130 and the fourth lens 140.

The optical imaging system 100 may include a plurality of filters 180 and 182. The filters 180 and 182 may be disposed between the seventh lens 170 and an imaging plane 190. At least one of the filters 180 and 182 may block infrared light, and the other may prevent contamination of the imaging plane caused by foreign objects.

The optical imaging system 100 may have a relatively low F No. For example, the optical imaging system 100 may have an F No. of 1.40. An overall length of the optical imaging system 100 may be 65 mm.

Table 1 lists characteristics of the lenses of the optical imaging system 100, and Table 2 lists aspheric coefficients of the lenses of the optical imaging system 100.

TABLE 1

| Surface No. | Note | Radius of Curvature | Thickness/ Distance | Refractive Index | Abbe No. | Focal Length |
|---|---|---|---|---|---|---|
| 1 | First | 18.452 | 7.841 | 1.773 | 49.60 | 31.8727 |
| 2 | Lens | 60 | 0.100 | | | |
| 3 | Second | 20 | 1.200 | 1.487 | 70.40 | −50.4263 |
| 4 | Lens | 10.811 | 2.780 | | | |
| 5 | Third | 18.601 | 4.561 | 1.822 | 24.00 | −21.7957 |
| 6 | Lens | 8.115 | 5.890 | | | |
| 7 | Stop | Infinity | 2.135 | | | |
| 8 | Fourth | −11.932 | 5.119 | 1.755 | 52.30 | −892.4553 |
| 9 | Lens | −14.389 | 0.100 | | | |
| 10 | Fifth | 30.002 | 5.202 | 1.804 | 46.50 | 16.4047 |
| 11 | Lens | −21.718 | 0.417 | | | |
| 12 | Sixth | −21.718 | 1.200 | 1.741 | 27.80 | −16.2450 |
| 13 | Lens | 27.622 | 2.252 | | | |
| 14 | Seventh | 22.663 | 8.000 | 1.619 | 63.90 | 17.4016 |
| 15 | Lens | −17.769 | 3.000 | | | |
| 16 | First | Infinity | 0.400 | 1.517 | 64.10 | |
| 17 | Filter | Infinity | 3.000 | | | |
| 18 | Second | Infinity | 0.500 | 1.517 | 64.10 | |
| 19 | Filter | Infinity | 11.292 | | | |
| 20 | Imaging Plane | Infinity | 0.012 | | | |

TABLE 2

| Surface No. | K | A | B | C | D |
|---|---|---|---|---|---|
| 5 | 0 | −1.02E−04 | −1.52E−07 | 1.20E−09 | — |
| 6 | 0 | −1.92E−04 | −9.40E−07 | −2.55E−09 | — |
| 14 | 0 | −3.41E−05 | 6.00E−08 | −8.43E−11 | — |
| 15 | 0 | 3.30E−05 | 4.25E−08 | 3.02E−10 | — |

Figure 2:
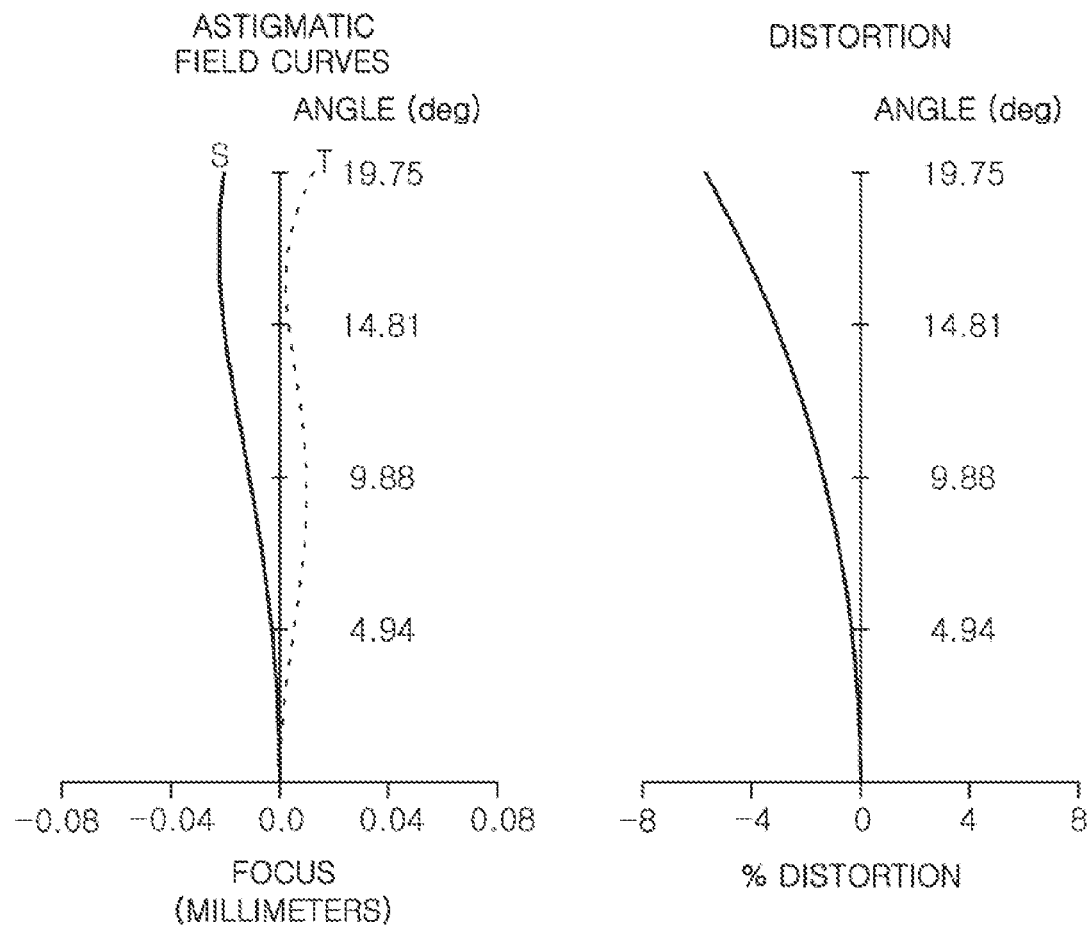
FIG. 2 illustrates aberration curves of the optical imaging system illustrated in FIG. 1.
Figure 3:
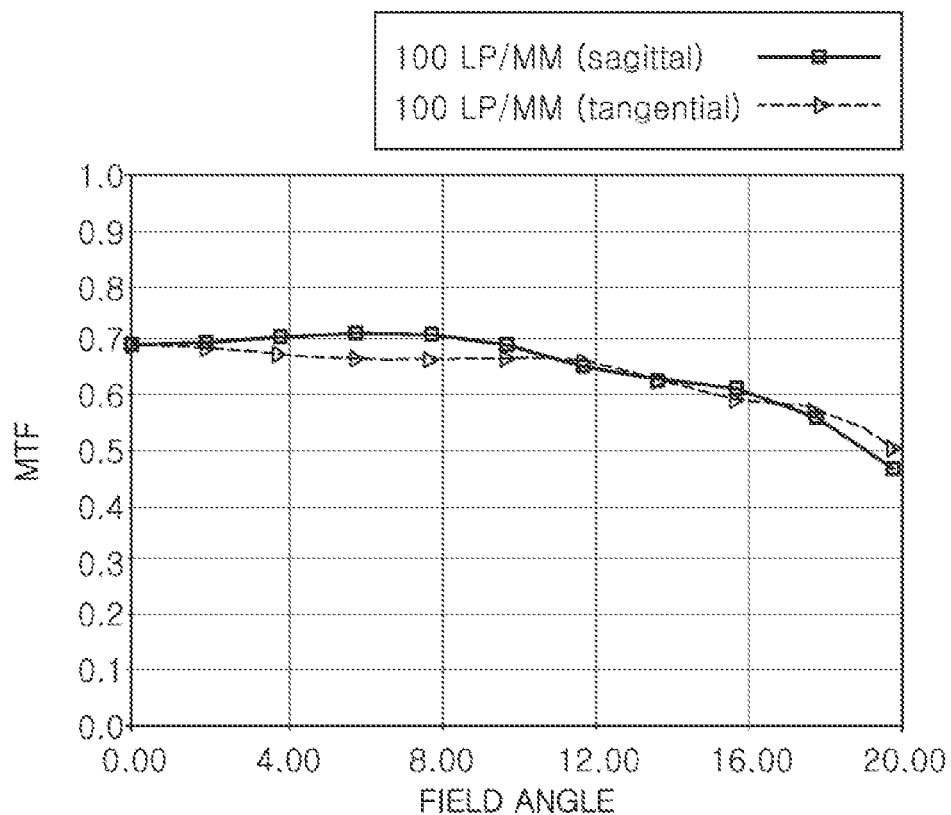
FIG. 3 illustrates MTF curves of the optical imaging system illustrated in FIG. 1 depending on temperature change.

FIG. 2 illustrates aberration curves of the optical imaging system 100, and FIG. 3 provides graphs illustrating MTF characteristics of the optical imaging system 100.

Figure 4:
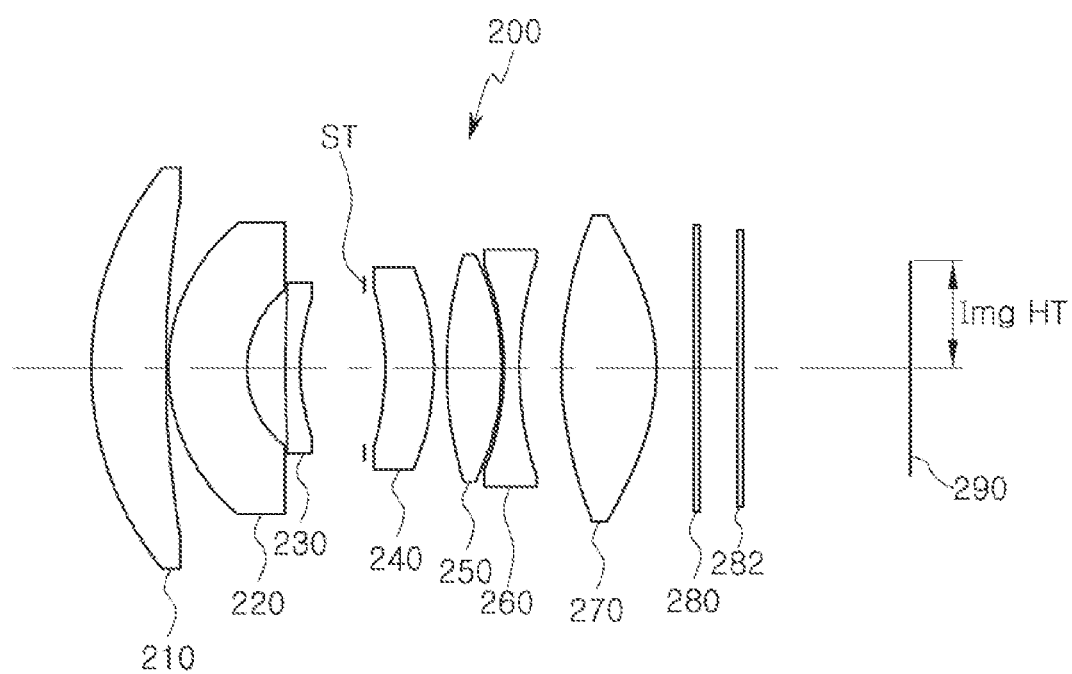
FIG. 4 is a diagram illustrating a second example of an optical imaging system.

A second example of an optical imaging system will be described with reference to FIG. 4.

An optical imaging system 200 may include a plurality of lenses having refractive power. For example, the optical imaging system 200 may include a first lens 210, a second lens 220, a third lens 230, a fourth lens 240, a fifth lens 250, a sixth lens 260, and a seventh lens 270.

The first lens 210 may have positive refractive power, and may have a convex object-side surface and a concave image-side surface. The second lens 220 may have negative refractive power, and may have a convex object-side surface and a concave image-side surface. The third lens 230 may have negative refractive power, and may have a convex object-side surface and a concave image-side surface. The fourth lens 240 may have positive refractive power, and may have a concave object-side surface and a convex image-side surface. The fifth lens 250 may have positive refractive power, and may have a convex object-side surface and a convex image-side surface. The sixth lens 260 may have negative refractive power, and may have a concave object-side surface and a concave image-side surface. The seventh lens 270 may have positive refractive power, and may have a convex object-side surface and a convex image-side surface.

The optical imaging system 200 may include a plurality of aspherical lenses. In the optical imaging system 200, both surfaces of the third lens 230 and both surfaces of the seventh lens 270 may be aspherical. The optical imaging system 200 may include a lens made of a glass material to exhibit constant optical performance even when temperature changes due to external conditions.

The optical imaging system 200 may include a stop ST. The stop ST may be disposed between the third lens 230 and the fourth lens 240.

The optical imaging system 200 may include a plurality of filters 280 and 282. The filters 280 and 282 may be disposed between the seventh lens 270 and an imaging plane 290. At least one of the filters 280 and 282 may block infrared light, and the other may prevent contamination of the imaging plane caused by foreign objects.

The optical imaging system 200 may have a relatively low F No. For example, the optical imaging system 200 may have an F No of 1.40. An overall length of the optical imaging system 200 may be 65 mm. In the optical imaging system 200, the third lens may have a size smaller than sizes of the other lenses, and thus, the third lens may be manufactured in aspherical shape, and manufacturing costs thereof may be reduced.

Table 3 lists characteristics of the lenses of the optical imaging system 200, and Table 4 lists aspheric coefficients of the lenses of the optical imaging system 200.

TABLE 3

| Surface No. | Note | Radius of Curvature | Thickness/ Distance | Refractive Index | Abbe No. | Focal Length |
|---|---|---|---|---|---|---|
| 1 | First | 24.861 | 5.933 | 1.773 | 49.60 | 45.166 |
| 2 | Lens | 77.49 | 0.200 | | | |
| 3 | Second | 14.625 | 6.243 | 1.785 | 25.80 | −35.803 |
| 4 | Lens | 7.813 | 3.028 | | | |
| 5 | Third | 77.518 | 1.200 | 1.810 | 40.90 | −25.584 |
| 6 | Lens | 16.238 | 5.044 | | | |
| 7 | Stop | Infinity | 1.682 | | | |
| 8 | Fourth | −22.427 | 3.861 | 1.729 | 54.70 | 179.305 |
| 9 | Lens | −20.533 | 1.011 | | | |
| 10 | Fifth | 29.664 | 4.375 | 1.804 | 46.60 | 15.506 |
| 11 | Lens | −20.091 | 0.200 | | | |
| 12 | Sixth | −20.925 | 1.200 | 1.785 | 25.80 | −14.861 |
| 13 | Lens | 27.008 | 3.356 | | | |
| 14 | Seventh | 27.836 | 7.515 | 1.670 | 55.40 | 16.880 |
| 15 | Lens | −16.968 | 3.000 | | | |
| 16 | First | Infinity | 0.400 | 1.517 | 64.10 | |
| 17 | Filter | Infinity | 3.000 | | | |
| 18 | Second | Infinity | 0.500 | 1.517 | 64.10 | |

TABLE 3-continued

| Surface No. | Note | Radius of Curvature | Thickness/ Distance | Refractive Index | Abbe No. | Focal Length |
|---|---|---|---|---|---|---|
| 19 | Filter | Infinity | 13.253 | | | |
| 20 | Imaging Plane | Infinity | −0.001 | | | |

TABLE 4

| Surface No. | K | A | B | C | D |
|---|---|---|---|---|---|
| 5 | 0 | −8.82E−05 | 6.19E−07 | −9.18E−10 | — |
| 6 | 0 | −3.57E−05 | 7.26E−07 | 1.38E−08 | — |
| 14 | 0 | −1.99E−05 | 2.40E−08 | 1.55E−10 | — |
| 15 | 0 | 3.84E−05 | 3.95E−08 | 2.45E−10 | 1.41E−12 |

Figure 5:
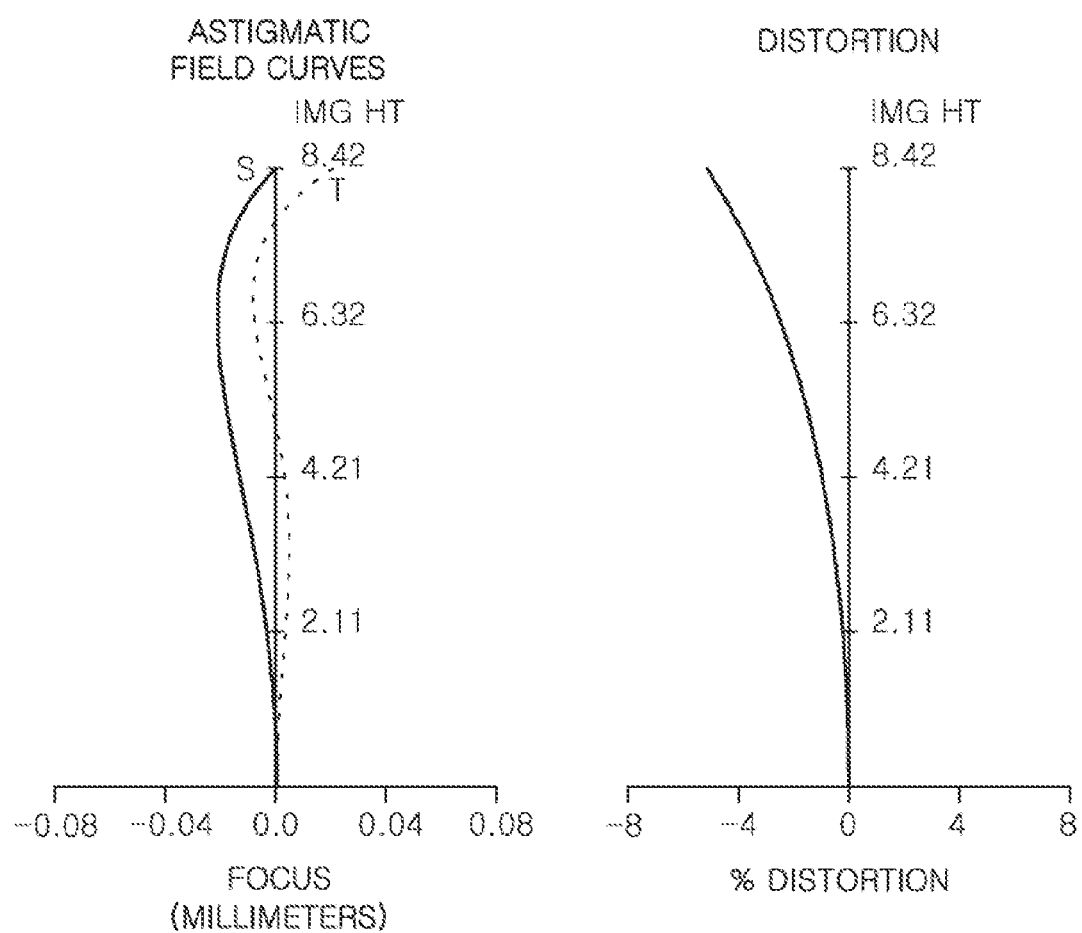
FIG. 5 illustrates aberration curves of the optical imaging system illustrated in FIG. 4.
Figure 6:
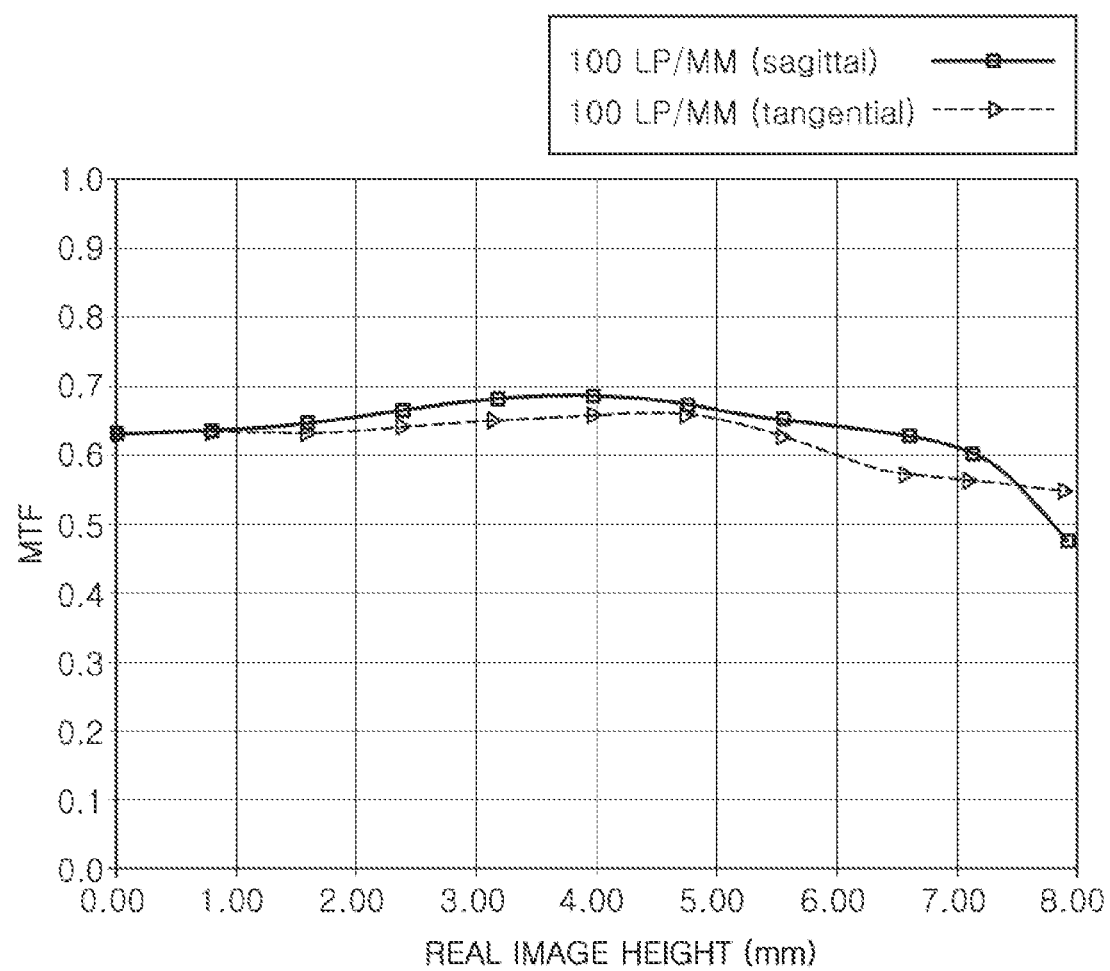
FIG. 6 illustrates MTF curves of the optical imaging system illustrated in FIG. 4 depending on temperature change.

FIG. 5 illustrates aberration curves of the optical imaging system 200, and FIG. 6 provides graphs illustrating MTF characteristics of the optical imaging system 200.

Figure 7:
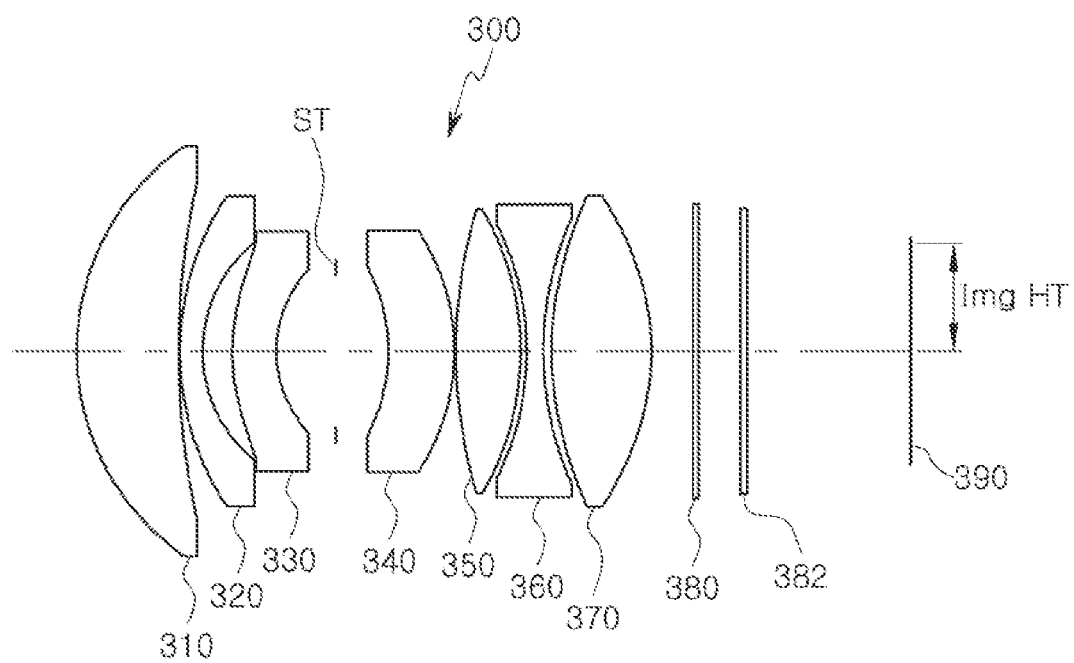
FIG. 7 is a diagram illustrating a third example of an optical imaging system.

A third example of an optical imaging system will be described with reference to FIG. 7.

An optical imaging system 300 may include a plurality of lenses having refractive power. For example, the optical imaging system 300 may include a first lens 310, a second lens 320, a third lens 330, a fourth lens 340, a fifth lens 350, a sixth lens 360, and a seventh lens 370.

The first lens 310 may have positive refractive power, and may have a convex object-side surface and a concave image-side surface. The second lens 320 may have negative refractive power, and may have a convex object-side surface and a concave image-side surface. The third lens 330 may have negative refractive power, and may have a convex object-side surface and a concave image-side surface. The fourth lens 340 may have negative refractive power, and may have a concave object-side surface and a convex image-side surface. The fifth lens 350 may have positive refractive power, and may have a convex object-side surface and a convex image-side surface. The sixth lens 360 may have negative refractive power, and may have a concave object-side surface and a concave image-side surface. The seventh lens 370 may have positive refractive power, and may have a convex object-side surface and a convex image-side surface.

The optical imaging system 300 may include a plurality of aspherical lenses. In the optical imaging system 300, both surfaces of the third lens 330 and both surfaces of the seventh lens 370 may be aspherical. The optical imaging system 300 may include a lens made of a glass material to exhibit constant optical performance even when temperature changes due to external conditions.

The optical imaging system 300 may include a stop ST. The stop ST may be disposed between the third lens 330 and the fourth lens 340.

The optical imaging system 300 may include a plurality of filters 380 and 382. The filters 380 and 382 may be disposed between the seventh lens 370 and an imaging plane 390. At least one of the filters 380 and 382 may block infrared light, and the other may prevent contamination of the imaging plane caused by foreign objects.

The optical imaging system 300 may have a relatively low F No. For example, the optical imaging system 300 may have an F No. of 1.45. An overall length of the optical imaging system 300 may be 60 mm.

Table 5 lists characteristics of the lenses of the optical imaging system 300, and Table 6 lists aspheric coefficients of the lenses of the optical imaging system 300.

TABLE 5

| Surface No. | Note | Radius of Curvature | Thickness/ Distance | Refractive Index | Abbe No. | Focal Length |
|---|---|---|---|---|---|---|
| 1 | First | 17.71 | 7.318 | 1.775 | 49.62 | 31.004 |
| 2 | Lens | 55.137 | 0.100 | | | |
| 3 | Second | 20 | 1.632 | 1.519 | 52.19 | -40.830 |
| 4 | Lens | 10.004 | 2.135 | | | |
| 5 | Third | 14.141 | 3.145 | 1.828 | 24.04 | -26.850 |
| 6 | Lens | 7.772 | 4.323 | | | |
| 7 | Stop | Infinity | 3.753 | | | |
| 8 | Fourth | -12.737 | 4.755 | 1.807 | 45.53 | -352.446 |
| 9 | Lens | -15.557 | 0.100 | | | |
| 10 | Fifth | 34.976 | 4.657 | 1.807 | 46.57 | 16.430 |
| 11 | Lens | -20.093 | 0.443 | | | |
| 12 | Sixth | -20.152 | 1.200 | 1.746 | 27.77 | -14.299 |
| 13 | Lens | 23.212 | 0.588 | | | |
| 14 | Seventh | 22.585 | 7.179 | 1.696 | 53.20 | 15.299 |
| 15 | Lens | -17.515 | 3.000 | | | |
| 16 | First | Infinity | 0.400 | 1.518 | 64.20 | |
| 17 | Filter | Infinity | 3.000 | | | |
| 18 | Second | Infinity | 0.500 | 1.518 | 64.20 | |
| 19 | Filter | Infinity | 11.771 | | | |
| 20 | Imaging Plane | Infinity | 0.000 | | | |

TABLE 6

| Surface No. | K | A | B | C |
|---|---|---|---|---|
| 5 | 0 | -1.47E-04 | -4.62E-07 | 2.66E-09 |
| 6 | 0 | -2.45E-04 | -1.37E-06 | -1.11E-08 |
| 14 | 0 | -3.08E-05 | 7.85E-08 | -2.00E-10 |
| 15 | 0 | 2.08E-05 | 4.59E-08 | 1.90E-10 |

Figure 8:
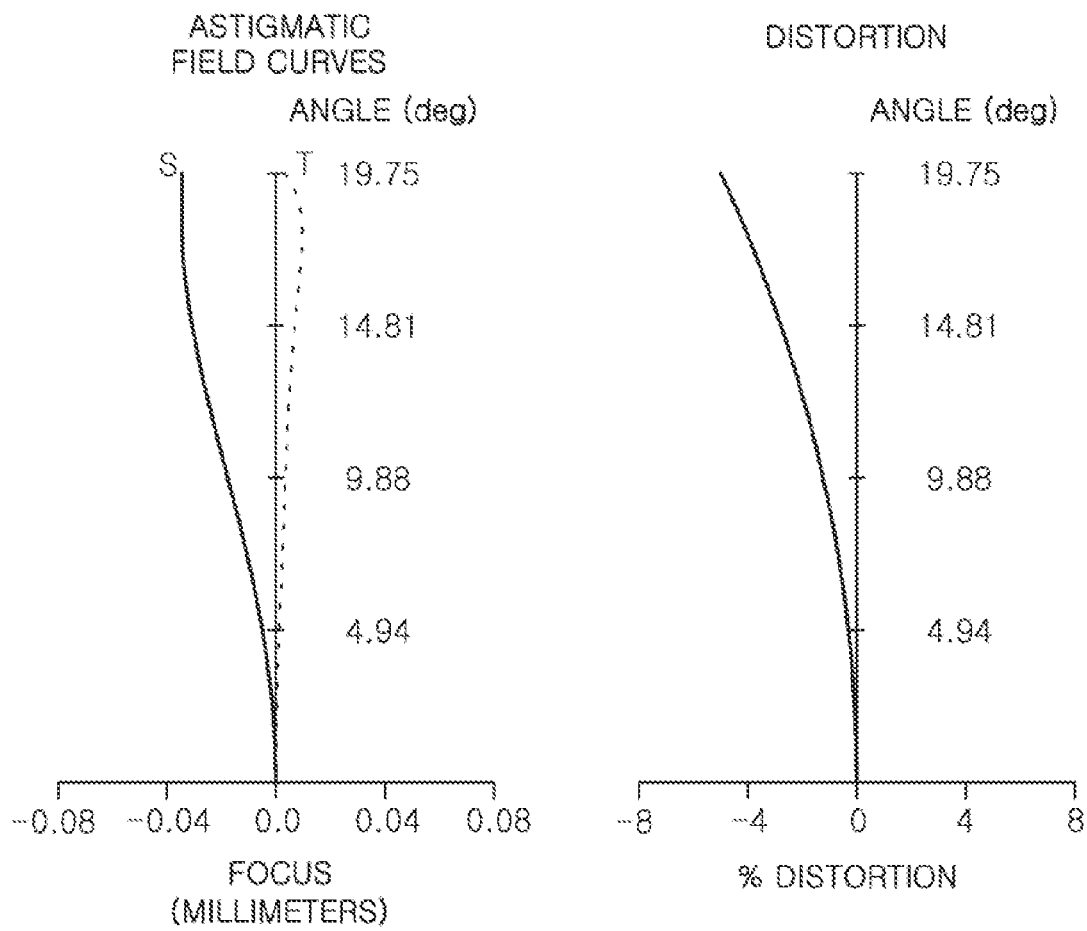
FIG. 8 illustrates aberration curves of the optical imaging system illustrated in FIG. 7.
Figure 9:
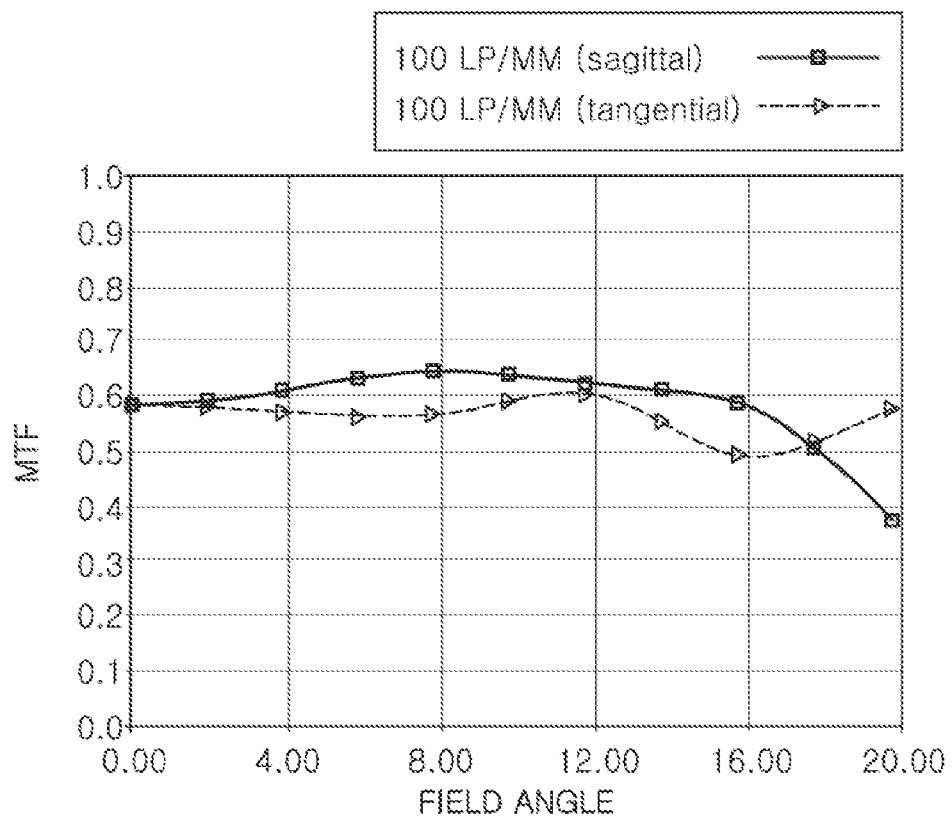
FIG. 9 illustrates MTF curves of the optical imaging system illustrated in FIG. 7 depending on temperature change.

FIG. 8 illustrates aberration curves of the optical imaging system 300, and FIG. 9 provides graphs illustrating MTF characteristics of the optical imaging system 300.

Figure 10:
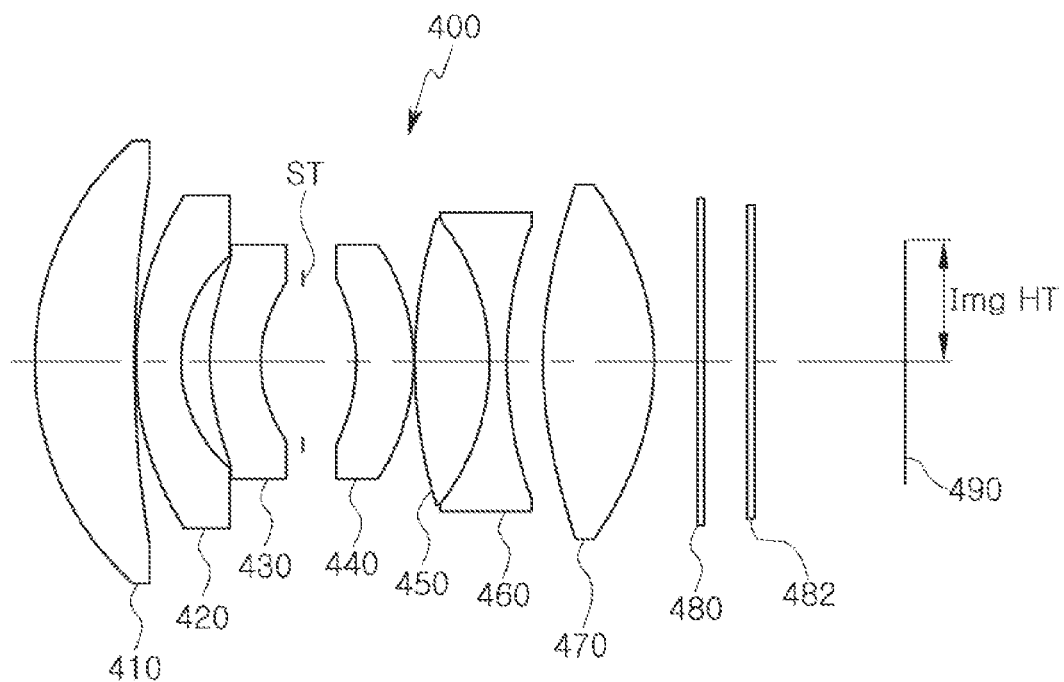
FIG. 10 is a diagram illustrating a fourth example of an optical imaging system.

A fourth example of an optical imaging system will be described with reference to FIG. 10.

An optical imaging system 400 may include a plurality of lenses having refractive power. For example, the optical imaging system 400 may include a first lens 410, a second lens 420, a third lens 430, a fourth lens 440, a fifth lens 450, a sixth lens 460, and a seventh lens 470.

The first lens 410 may have positive refractive power, and may have a convex object-side surface and a concave image-side surface. The second lens 420 may have negative refractive power, and may have a convex object-side surface and a concave image-side surface. The third lens 430 may have negative refractive power, and may have a convex object-side surface and a concave image-side surface. The fourth lens 440 may have negative refractive power, and may have a concave object-side surface and a convex image-side surface. The fifth lens 450 may have positive refractive power, and may have a convex object-side surface and a convex image-side surface. The sixth lens 460 may have negative refractive power, and may have a concave object-side surface and a concave image-side surface. The seventh lens 470 may have positive refractive power, and may have a convex object-side surface and a convex image-side surface.

The optical imaging system 400 may include a plurality of aspherical lenses. In the optical imaging system 400, both surfaces of the third lens 430 and both surfaces of the seventh lens 470 may be aspherical. The optical imaging system 400 may include a lens made of a glass material to exhibit constant optical performance even when temperature changes due to external conditions.

The optical imaging system 400 may include a stop ST. The stop ST may be disposed between the third lens 430 and the fourth lens 440.

The optical imaging system 400 may include a plurality of filters 480 and 482. The filters 480 and 482 may be disposed between the seventh lens 470 and an imaging plane 490. At least one of the filters 480 and 482 may block infrared light, and the other may prevent contamination of the imaging plane caused by foreign objects.

The optical imaging system 400 may have a relatively low F No. For example, the optical imaging system 400 may have an F No. of 1.45. An overall length of the optical imaging system 400 may be 60 mm. In the optical imaging system 400, the fifth lens and the sixth lens may be configured as a cemented lens. However, when high reliability against temperature is required, the fifth lens and the sixth lens may be separated from each other.

Table 7 lists characteristics of the lenses of the optical imaging system 400, and Table 8 lists aspheric coefficients of the lenses of the optical imaging system 400.

TABLE 7

| Surface No. | Note | Radius of Curvature | Thickness/ Distance | Refractive Index | Abbe No. | Focal Length |
|---|---|---|---|---|---|---|
| 1 | First | 19.452 | 6.869 | 1.773 | 49.60 | 32.610 |
| 2 | Lens | 72.243 | 0.100 | | | |
| 3 | Second | 20 | 3.123 | 1.517 | 52.20 | -36.384 |
| 4 | Lens | 9.181 | 1.977 | | | |
| 5 | Third | 13.973 | 3.508 | 1.822 | 24.00 | -30.139 |
| 6 | Lens | 7.921 | 2.934 | | | |
| 7 | Stop | Infinity | 3.647 | | | |
| 8 | Fourth | -11.656 | 3.940 | 1.803 | 45.50 | -974.129 |
| 9 | Lens | -13.614 | 0.100 | | | |
| 10 | Fifth | 31.021 | 5.152 | 1.804 | 46.60 | 13.144 |
| 11 | Lens | -14.842 | 0.000 | | | |
| 12 | Sixth | -14.842 | 1.200 | 1.741 | 27.80 | -12.481 |
| 13 | Lens | 25.364 | 2.476 | | | |
| 14 | Seventh | 26.145 | 7.673 | 1.694 | 53.20 | 15.961 |
| 15 | Lens | -16.889 | 3.000 | | | |
| 16 | First | Infinity | 0.400 | 1.517 | 64.20 | |
| 17 | Filter | Infinity | 3.000 | | | |
| 18 | Second | Infinity | 0.500 | 1.517 | 64.20 | |
| 19 | Filter | Infinity | 10.403 | | | |
| 20 | Imaging Plane | Infinity | 0.000 | | | |

TABLE 8

| Surface No. | K | A | B | C |
|---|---|---|---|---|
| 5 | 0 | -1.45E-04 | -9.21E-07 | 3.86E-09 |
| 6 | 0 | -2.66E-04 | -2.74E-06 | -1.57E-10 |
| 14 | 0 | -3.42E-05 | 5.80E-08 | -1.51E-10 |
| 15 | 0 | 2.56E-05 | 3.35E-08 | 1.96E-10 |

Figure 11:
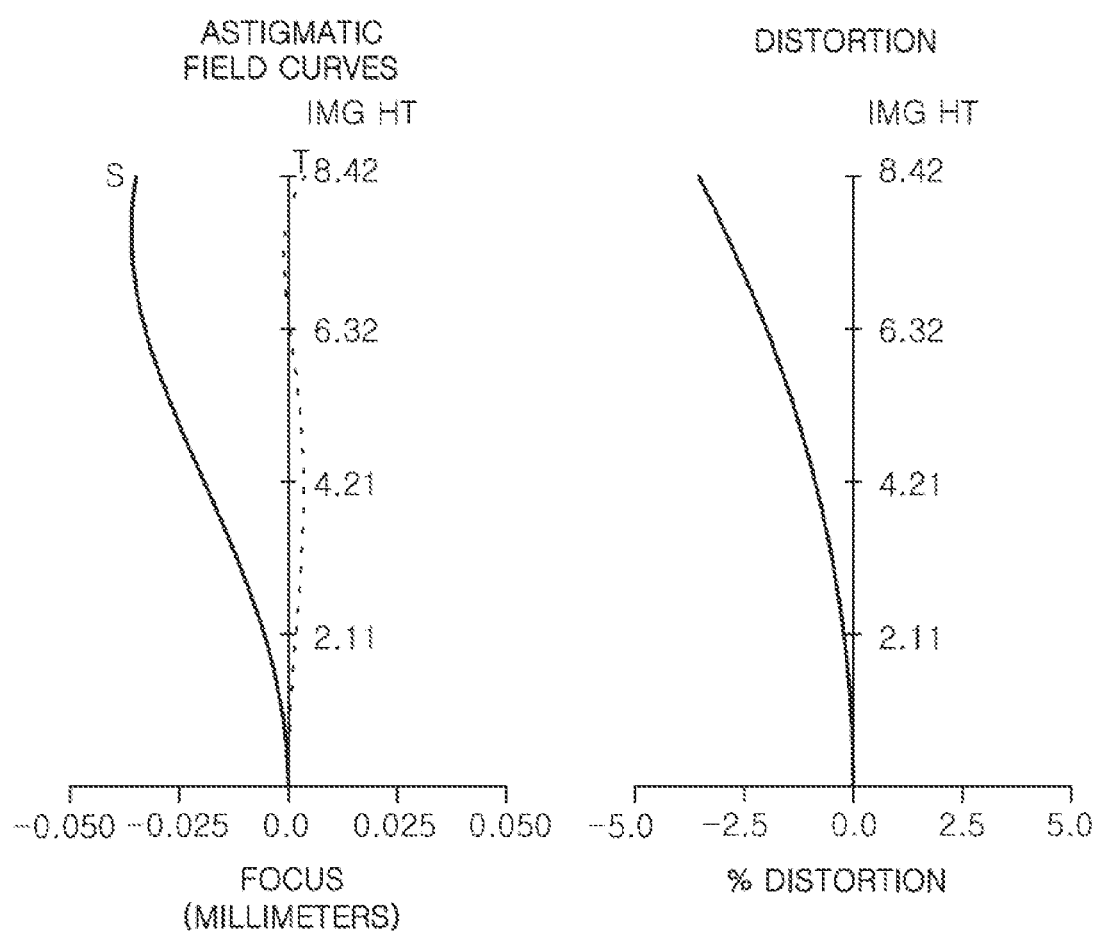
FIG. 11 illustrates aberration curves of the optical imaging system illustrated in FIG. 10.
Figure 12:
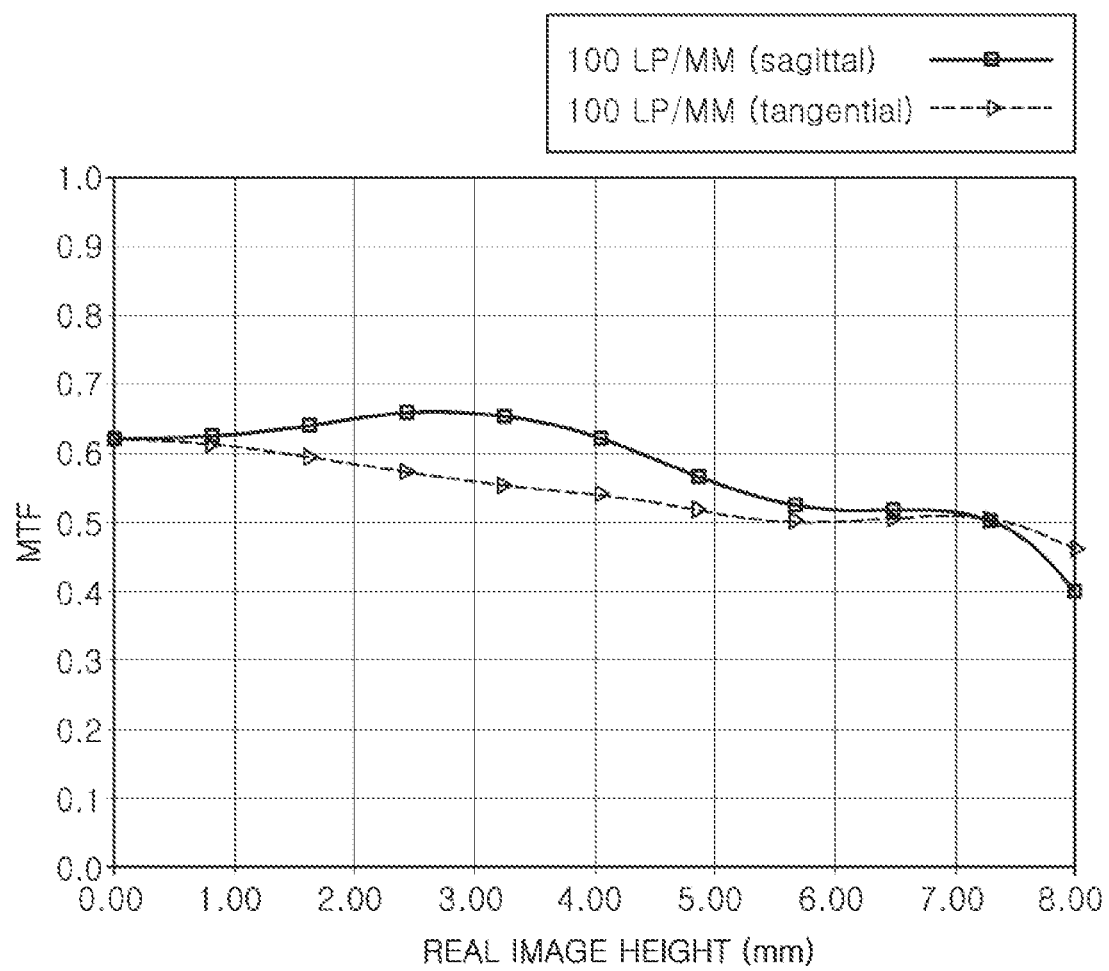
FIG. 12 illustrates MTF curves of the optical imaging system illustrated in FIG. 10 depending on temperature change.

FIG. 11 illustrates aberration curves of the optical imaging system 400, and FIG. 12 provides graphs illustrating MTF characteristics of the optical imaging system 400.

Figure 13:
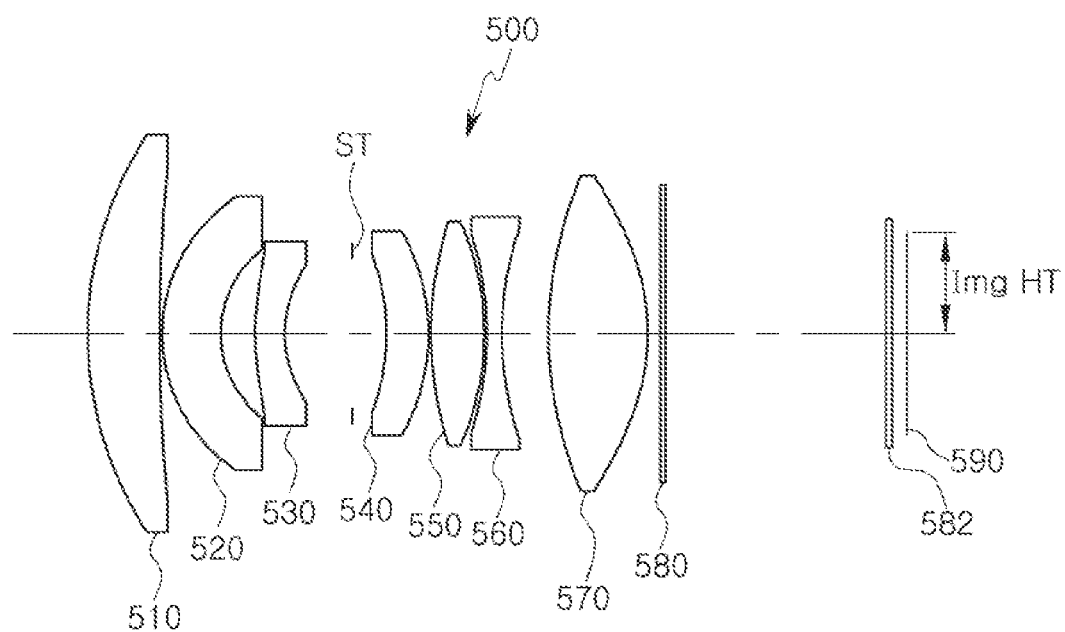
FIG. 13 is a diagram illustrating a fifth example of an optical imaging system.

A fifth example of an optical imaging system will be described with reference to FIG. 13.

An optical imaging system 500 may include a plurality of lenses having refractive power. For example, the optical imaging system 500 may include a first lens 510, a second lens 520, a third lens 530, a fourth lens 540, a fifth lens 550, a sixth lens 560, and a seventh lens 570.

The first lens 510 may have positive refractive power, and may have a convex object-side surface and a concave image-side surface. The second lens 520 may have negative refractive power, and may have a convex object-side surface and a concave image-side surface. The third lens 530 may have negative refractive power, and may have a convex object-side surface and a concave image-side surface. The fourth lens 540 may have positive refractive power, and may have a concave object-side surface and a convex image-side surface. The fifth lens 550 may have positive refractive power, and may have a convex object-side surface and a convex image-side surface. The sixth lens 560 may have negative refractive power, and may have a concave object-side surface and a concave image-side surface. The seventh lens 570 may have positive refractive power, and may have a convex object-side surface and a convex image-side surface.

The optical imaging system 500 may include a plurality of aspherical lenses. In the optical imaging system 500, both surfaces of the third lens 530 and both surfaces of the seventh lens 570 may be aspherical. The optical imaging system 500 may include a lens made of a glass material to exhibit constant optical performance even when temperature changes due to external conditions.

The optical imaging system 500 may include a stop ST. The stop ST may be disposed between the third lens 530 and the fourth lens 540.

The optical imaging system 500 may include a plurality of filters 580 and 582. The filters 580 and 582 may be disposed between the seventh lens 570 and an imaging plane 590. At least one of the filters 580 and 582 may block infrared light, and the other may prevent contamination of the imaging plane caused by foreign objects.

The optical imaging system 500 may have a relatively low F No. For example, the optical imaging system 500 may have an F No. of 1.45. An overall length of the optical imaging system 500 may be 65 mm.

Table 9 lists characteristics of the lenses of the optical imaging system 500, and Table 10 lists aspheric coefficients of the lenses of the optical imaging system 500.

TABLE 9

| Surface No. | Note | Radius of Curvature | Thickness/ Distance | Refractive Index | Abbe No. | Focal Length |
|---|---|---|---|---|---|---|
| 1 | First | 28.346 | 5.708 | 1.773 | 49.62 | 44.772 |
| 2 | Lens | 143.318 | 0.200 | | | |
| 3 | Second | 12.811 | 4.647 | 1.785 | 25.72 | -56.989 |
| 4 | Lens | 8.37 | 2.720 | | | |
| 5 | Third | 19.671 | 2.342 | 1.810 | 40.95 | -19.735 |
| 6 | Lens | 8.349 | 5.366 | | | |
| 7 | Stop | Infinity | 2.717 | | | |
| 8 | Fourth | -17.45 | 3.336 | 1.729 | 54.67 | 152.976 |
| 9 | Lens | -16.306 | 0.200 | | | |
| 10 | Fifth | 28.788 | 4.227 | 1.729 | 54.67 | 17.445 |
| 11 | Lens | -21.382 | 0.200 | | | |
| 12 | Sixth | -25.738 | 1.200 | 1.785 | 25.72 | -16.206 |
| 13 | Lens | 25.652 | 3.665 | | | |
| 14 | Seventh | 27.376 | 7.920 | 1.670 | 55.43 | 16.752 |
| 15 | Lens | -16.795 | 1.000 | | | |
| 16 | First | Infinity | 0.400 | 1.517 | 64.17 | |
| 17 | Filter | Infinity | 17.452 | | | |
| 18 | Second | Infinity | 0.500 | 1.498 | 66.95 | |
| 19 | Filter | Infinity | 1.205 | | | |
| 20 | Imaging Plane | Infinity | -0.006 | | | |

TABLE 10

| Surface No. | K | A | B | C | D |
|---|---|---|---|---|---|
| 5 | 0 | -2.50E-04 | 1.39E-06 | -5.61E-09 | 0 |
| 6 | 0 | -3.64E-04 | 1.36E-06 | -2.67E-08 | 0 |

TABLE 10-continued

| Surface No. | K | A | B | C | D |
|---|---|---|---|---|---|
| 14 | 0 | -2.36E-05 | 3.03E-08 | 1.20E-10 | 0 |
| 15 | 0 | 3.51E-05 | 4.91E-08 | 1.35E-10 | 1.72E-01 |

Figure 14:
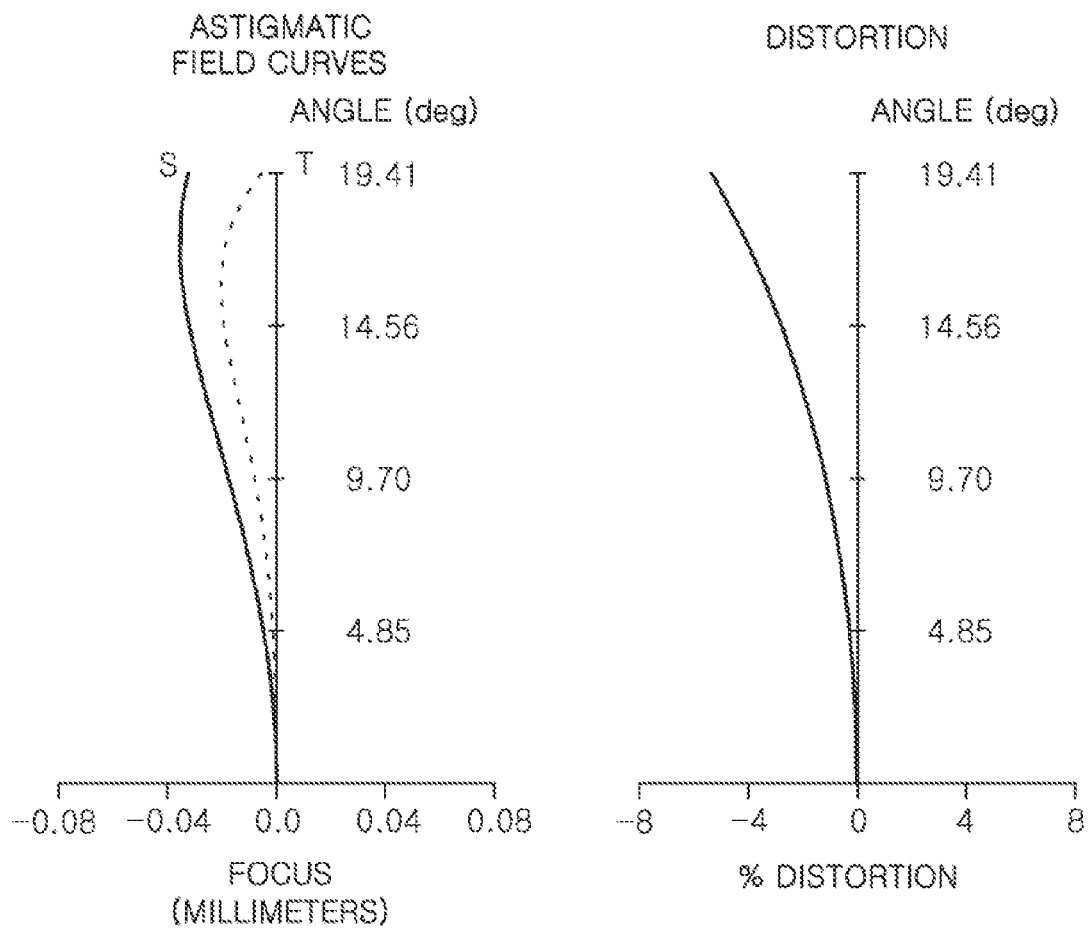
FIG. 14 illustrates aberration curves of the optical imaging system illustrated in FIG. 13.
Figure 15:
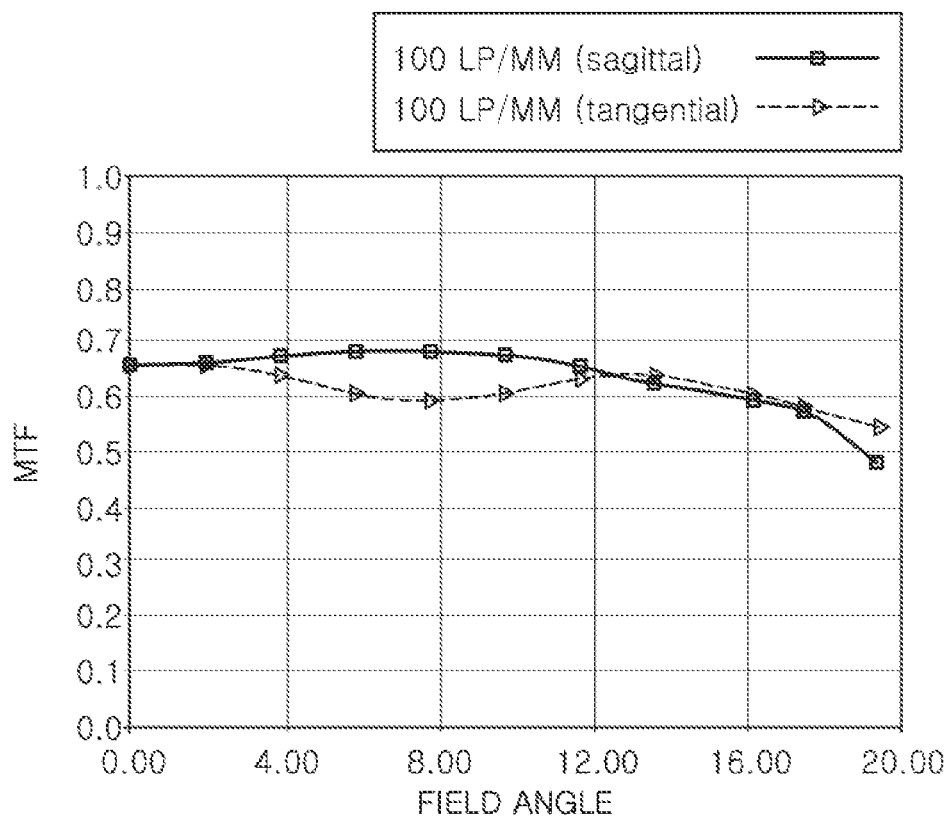
FIG. 15 illustrates MTF curves of the optical imaging system illustrated in FIG. 13 depending on temperature change.

FIG. 14 illustrates aberration curves of the optical imaging system 500, and FIG. 15 provides graphs illustrating MTF characteristics of the optical imaging system 500.

Figure 16:
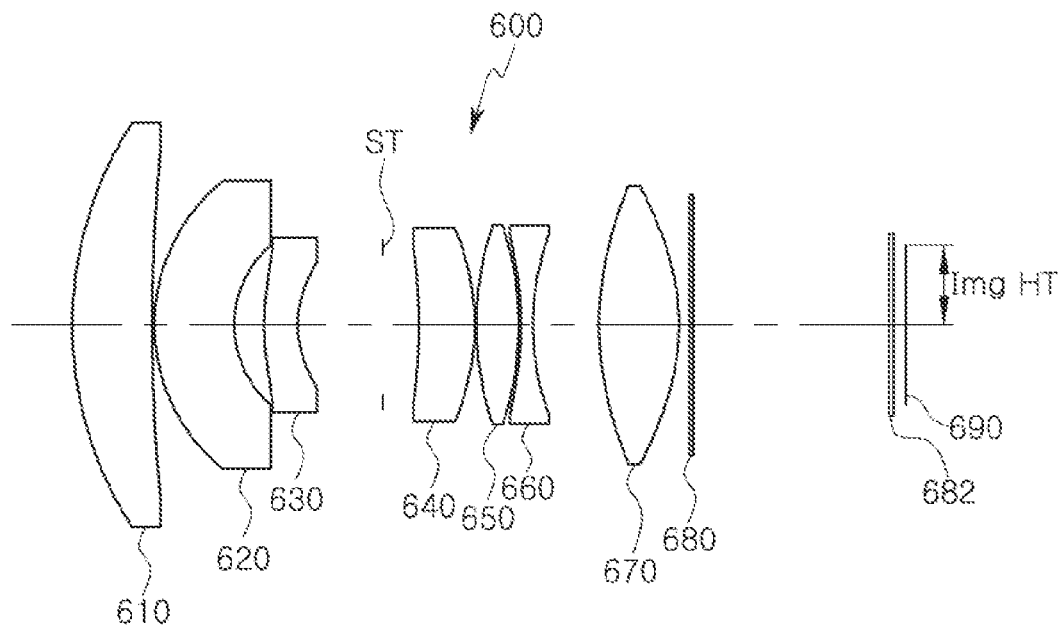
FIG. 16 is a diagram illustrating a sixth example of an optical imaging system.

A sixth example of an optical imaging system will be described with reference to FIG. 16.

An optical imaging system 600 may include a plurality of lenses having refractive power. For example, the optical imaging system 600 may include a first lens 610, a second lens 620, a third lens 630, a fourth lens 640, a fifth lens 650, a sixth lens 660, and a seventh lens 670.

The first lens 610 may have positive refractive power, and may have a convex object-side surface and a concave image-side surface. The second lens 620 may have negative refractive power, and may have a convex object-side surface and a concave image-side surface. The third lens 630 may have negative refractive power, and may have a convex object-side surface and a concave image-side surface. The fourth lens 640 may have positive refractive power, and may have a concave object-side surface and a convex image-side surface. The fifth lens 650 may have positive refractive power, and may have a convex object-side surface and a convex image-side surface. The sixth lens 660 may have negative refractive power, and may have a concave object-side surface and a concave image-side surface. The seventh lens 670 may have positive refractive power, and may have a convex object-side surface and a convex image-side surface.

The optical imaging system 600 may include a plurality of aspherical lenses. In the optical imaging system 600, both surfaces of the third lens 630 and both surfaces of the seventh lens 670 may be aspherical. The optical imaging system 600 may include a lens made of a glass material to exhibit constant optical performance even when temperature changes due to external conditions.

The optical imaging system 600 may include a stop ST. The stop ST may be disposed between the third lens 630 and the fourth lens 640.

The optical imaging system 600 may include a plurality of filters 680 and 682. The filters 680 and 682 may be disposed between the seventh lens 670 and an imaging plane 690. At least one of the filters 680 and 682 may block infrared light, and the other may prevent contamination of the imaging plane caused by foreign objects.

An overall length of the optical imaging system 600 may be 83.340 mm.

Table 11 lists characteristics of the lenses of the optical imaging system 600, and Table 12 lists aspheric coefficients of the lenses of the optical imaging system 600.

TABLE 11

| Surface No. | Note | Radius of Curvature | Thickness/ Distance | Refractive Index | Abbe No. | Focal Length |
|---|---|---|---|---|---|---|
| 1 | First | 36.734 | 8.000 | 1.773 | 49.62 | 57.698 |
| 2 | Lens | 189.071 | 0.200 | | | |
| 3 | Second | 18.422 | 8.000 | 1.785 | 25.72 | -56.878 |
| 4 | Lens | 10.55 | 2.981 | | | |
| 5 | Third | 23.783 | 3.345 | 1.810 | 40.95 | -22.138 |
| 6 | Lens | 9.58 | 8.505 | | | |
| 7 | Stop | Infinity | 3.620 | | | |

TABLE 11-continued

| Surface No. | Note | Radius of Curvature | Thickness/ Distance | Refractive Index | Abbe No. | Focal Length |
|---|---|---|---|---|---|---|
| 8 | Fourth | −57.018 | 5.561 | 1.729 | 54.67 | 55.718 |
| 9 | Lens | −24.7 | 0.200 | | | |
| 10 | Fifth | 31.009 | 4.235 | 1.729 | 54.67 | 21.940 |
| 11 | Lens | −31.148 | 0.200 | | | |
| 12 | Sixth | −35.897 | 1.200 | 1.785 | 25.72 | −18.740 |
| 13 | Lens | 25.276 | 6.638 | | | |
| 14 | Seventh | 31.303 | 8.000 | 1.670 | 55.43 | 20.730 |
| 15 | Lens | −22.378 | 1.000 | | | |
| 16 | First | Infinity | 0.400 | 1.517 | 64.17 | |
| 17 | Filter | Infinity | 19.556 | | | |
| 18 | Second | Infinity | 0.500 | 1.498 | 66.95 | |
| 19 | Filter | Infinity | 1.208 | | | |
| 20 | Imaging Plane | Infinity | −0.009 | | | |

TABLE 12

| Surface No. | K | A | B | C | D |
|---|---|---|---|---|---|
| 5 | 0 | −1.58E−04 | 4.68E−07 | −7.44E−10 | 0 |
| 6 | 0 | −2.63E−04 | 3.57E−07 | −1.16E−08 | 0 |
| 14 | 0 | −8.26E−06 | −5.61E−09 | 5.07E−11 | 0 |
| 15 | 0 | 2.18E−05 | −3.94E−09 | 6.69E−11 | 1.01E−13 |

Figure 17:
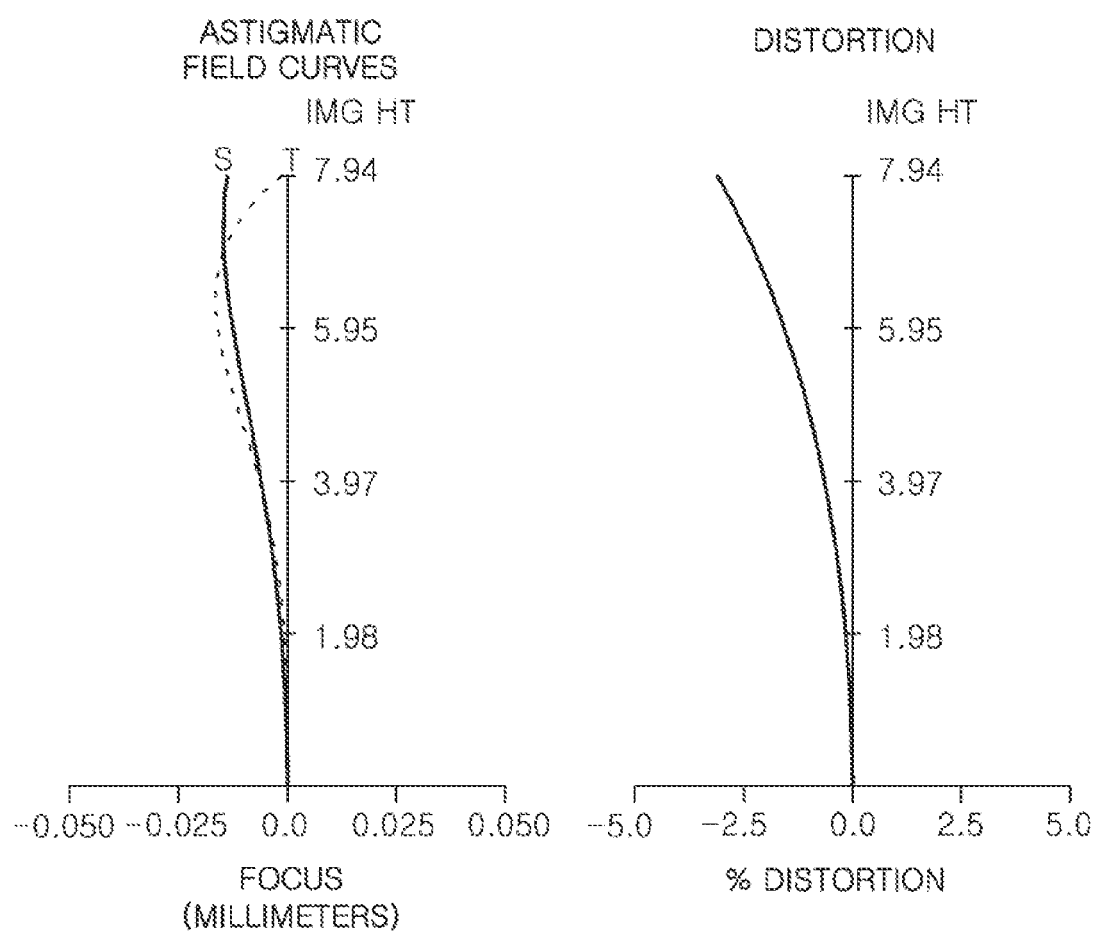
FIG. 17 illustrates aberration curves of the optical imaging system illustrated in FIG. 16.
Figure 18:
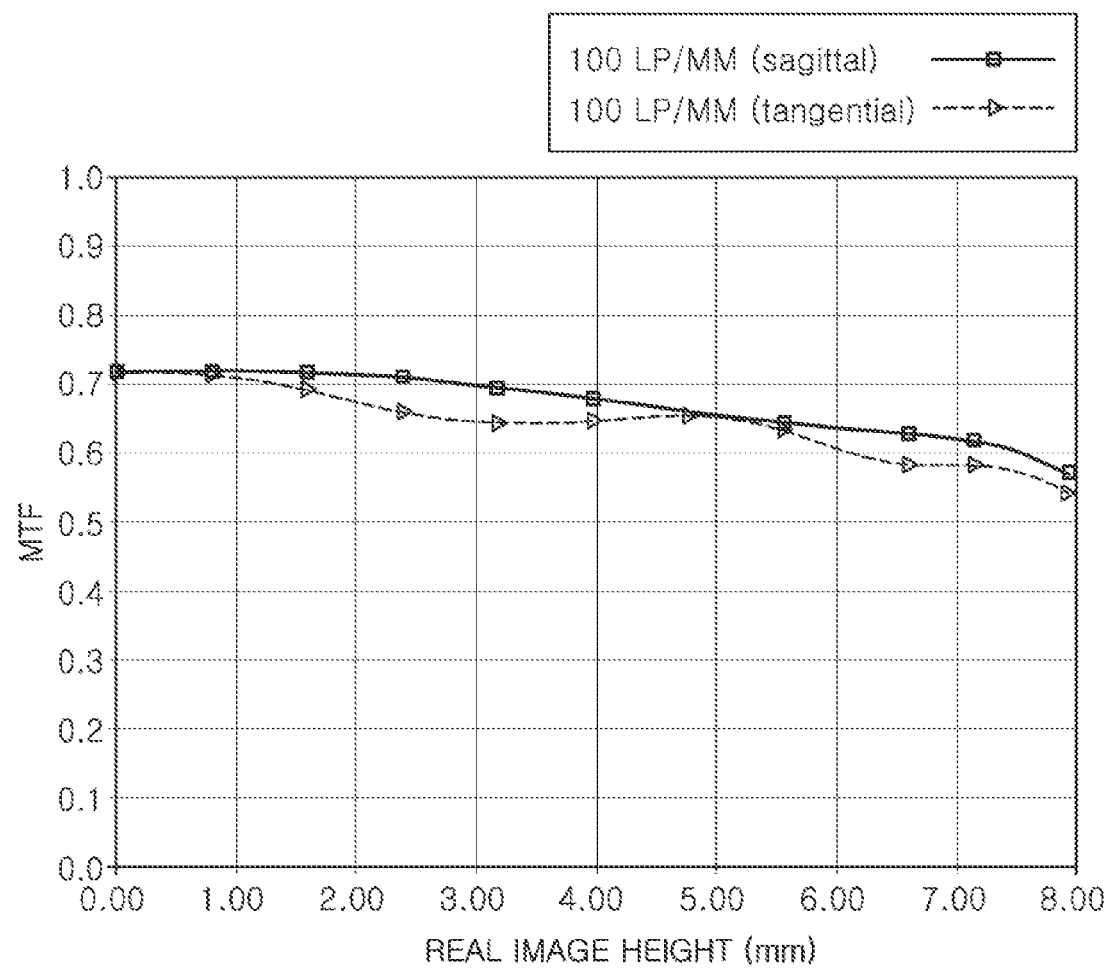
FIG. 18 illustrates MTF curves of the optical imaging system illustrated in FIG. 16 depending on temperature change.

FIG. 17 illustrates aberration curves of the optical imaging system 600, and FIG. 18 provides graphs illustrating MTF characteristics of the optical imaging system 600.

In the optical imaging systems described in the examples, focal lengths of the first to seventh lenses may be determined within a certain range. For example, a focal length of the first lens may be within a range of 25 mm to 65 mm, a focal length of the second lens may be within a range of −60 mm to −30 mm, a focal length of the third lens may be within a range of −35 mm to −15 mm, a focal length of the fourth lens may be −300 mm or less or 50 mm or greater, a focal length of the fifth lens may be within a range of 10 mm to 25 mm, a focal length of the sixth lens may be within a range of −25 mm to −10 mm, and a focal length of the seventh lens may be within a range of 10 mm to 25 mm.

According to the examples, an optical imaging system having an improved resolution and improved aberration may be implemented.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An optical imaging system comprising:
a first lens having a positive refractive power and a convex object-side surface in an optical axis region thereof;
a second lens having a negative refractive power, a convex object-side surface in an optical axis region thereof and a concave image-side surface in an optical axis region thereof;
a third lens having a refractive power;
a fourth lens having a negative refractive power;
a fifth lens having a convex image-side surface in an optical axis region thereof;
a sixth lens having a negative refractive power and a concave image-side surface in an optical axis region thereof; and
a seventh lens having a convex object-side surface in an optical axis region thereof,
wherein the first to seventh lenses are sequentially disposed in ascending numerical order from an object side of the optical imaging system toward an imaging plane of the optical imaging system,
the optical imaging system has a total number of seven lenses having a refractive power,
a distance from the image-side surface of the sixth lens to the object-side surface of the seventh lens along an optical axis of the optical imaging system is greater than a distance from the image-side surface of the fifth lens to an object-side surface of the sixth lens along the optical axis,
a radius of curvature of an object-side surface of the fifth lens at the optical axis is greater than a radius of curvature of an image-side surface of the third lens at the optical axis,
a radius of curvature of the object-side surface of the second lens at the optical axis is greater than a radius of curvature of the object-side surface of the sixth lens at the optical axis,
a sum of an Abbe number of the second lens and an Abbe number of the third lens is within a range of 60 to 100, and
a distance from an image-side surface of the fourth lens to the object-side surface of the fifth lens along the optical axis is equal to or greater than a distance from an image-side surface of the first lens to the object-side surface of the second lens along the optical axis.

2. The optical imaging system of claim 1, wherein the image-side surface of the first lens is concave in an optical axis region thereof.

3. The optical imaging system of claim 1, wherein the fifth lens has a positive refractive power.

4. The optical imaging system of claim 1, wherein an Abbe number of the seventh lens is 50 or higher.

5. The optical imaging system of claim 1, wherein a focal length of the second lens is within a range of −60 mm to −30 mm.

6. The optical imaging system of claim 1, wherein a focal length of the sixth lens is within a range of −25 mm to −10 mm.

7. The optical imaging system of claim 1, wherein an absolute value of a radius of curvature of an object-side surface of the fourth lens is greater than an absolute value of the radius of curvature of the image-side surface of the third lens.

* * * * *